(12) United States Patent
Koch

(10) Patent No.: US 9,429,185 B2
(45) Date of Patent: Aug. 30, 2016

(54) COUPLING ROD OF A TURBOCHARGER

(75) Inventor: Silvio Koch, Kirchheimbolanden (DE)

(73) Assignee: BorgWarner Inc., Auburn Hills, MI (US)

( * ) Notice: Subject to any disclaimer, the term of this patent is extended or adjusted under 35 U.S.C. 154(b) by 419 days.

(21) Appl. No.: 13/127,765

(22) PCT Filed: Nov. 5, 2009

(86) PCT No.: PCT/US2009/063352
§ 371 (c)(1),
(2), (4) Date: May 5, 2011

(87) PCT Pub. No.: WO2010/056586
PCT Pub. Date: May 20, 2010

(65) Prior Publication Data
US 2011/0211905 A1 Sep. 1, 2011

(30) Foreign Application Priority Data
Nov. 12, 2008 (DE) .................. 10 2008 056 922

(51) Int. Cl.
*F16C 11/00* (2006.01)
*F16C 11/06* (2006.01)

(52) U.S. Cl.
CPC ..... *F16C 11/0623* (2013.01); *Y10T 403/32811* (2015.01)

(58) Field of Classification Search
CPC ............ F16C 11/0623; F16C 11/0633; F16C 11/0604; F16C 11/0614; Y10T 403/32811
USPC ............ 403/76, 77, 122, 132–138, 142–144; 285/261, 268, 269, 271; 384/203–206, 384/208–209; 267/160, 16; 464/118, 138
See application file for complete search history.

(56) References Cited

U.S. PATENT DOCUMENTS

| | | | | |
|---|---|---|---|---|
| 2,165,052 A | * | 7/1939 | Hering | 285/111 |
| 3,273,924 A | * | 9/1966 | Maxeiner | 403/140 |
| 4,720,205 A | * | 1/1988 | Ito | 403/140 |
| 5,230,580 A | * | 7/1993 | Henkel | 403/135 |
| 5,551,791 A | * | 9/1996 | Schneider | 403/144 |
| 5,672,024 A | * | 9/1997 | Maughan et al. | 403/141 |
| 5,752,780 A | * | 5/1998 | Dorr | 403/135 |
| 5,772,352 A | * | 6/1998 | Fukumoto et al. | 403/144 |
| 6,030,141 A | * | 2/2000 | Lieber et al. | 403/135 |
| 6,254,114 B1 | * | 7/2001 | Pulling et al. | 280/93.511 |
| 2003/0180089 A1 | * | 9/2003 | Heuser et al. | 403/135 |
| 2008/0279618 A1 | * | 11/2008 | Erdogan | 403/138 |

FOREIGN PATENT DOCUMENTS

| | | | | |
|---|---|---|---|---|
| DE | 857714 A1 | * | 7/1947 | 403/135 |
| DE | 4138609 A1 | * | 5/1993 | 403/135 |

* cited by examiner

*Primary Examiner* — Gregory Binda
*Assistant Examiner* — Nahid Amiri
(74) *Attorney, Agent, or Firm* — A. Michael Tucker; Stephan A. Pendorf; Patent Central LLC

(57) ABSTRACT

A coupling rod (1) for a turbocharger has a first rod part (2) which has a ball head (3). The coupling rod (1) further has a second rod part (4) which has a joint socket (5) for holding the ball head (3). A guide element (8, 9) is arranged between an inner peripheral surface (6) of the joint socket (5) and an outer peripheral surface (7) of the ball head (3). The guide element (8, 9) has at least one spring tongue (10, 11) which bears against the outer peripheral surface (7). The guide element (8, 9) is connected to a support section (12, 13) which is supported on the inner peripheral surface (6).

9 Claims, 3 Drawing Sheets

COUPLING ROD OF A TURBOCHARGER

FIELD OF THE INVENTION

The invention relates to a coupling rod for a turbocharger.

BACKGROUND OF THE INVENTION

Coupling rods or coupling levers of said type are used in an articulated mechanism of a turbocharger.

On the hot side of the turbocharger, in particular in a temperature range of above 300° C., with coupling rods of said type, it has hitherto only been possible for those metallic parts of a ball joint which are in engagement to run directly on one another without the interposition of a buffer element. However, this has the disadvantage of increased wear, and furthermore, it is not possible to provide the coupling rod or the ball joint with vibration-damping properties.

SUMMARY OF THE INVENTION

It is therefore an object of the present invention to create a coupling rod or a coupling lever which permits an improved tribological pairing of the contact partners with simultaneous vibration damping.

This object is achieved by means of a coupling rod as described herein. The coupling rod has a first rod and a second rod. The first rod has a ball head, and the second rod has a joint socket holding the ball head. A guide element is arranged between an inner peripheral surface of the joint socket and an outer peripheral surface of the ball head. The guide element includes one or more spring tongues and one or more support sections. The one or more spring tongues bears against the outer peripheral surface and are connected to the one or more support sections. The one or more support sections are supported on the inner peripheral surface.

The principle according to the invention is based on the generation of a defined preload force by providing at least one spring tongue, but preferably a multiplicity of spring tongues, which are joined into the joint of the coupling rod or of the lever.

Here, it is simultaneously possible to produce an expedient tribological pairing between the guide element which is used and the ball head. Furthermore, it is preferably possible to use a cheaper material for the parts of the coupling rod or of the lever than has been used in previous known designs.

On account of the elastic deformation, the coupling rod according to the invention has vibration-damping properties and may also be used over a significantly wider temperature range than previous designs.

In principle, it is possible to provide a single guide element for the coupling rod according to the invention.

The coupling rod can have additional advantageous features and arrangements. For instance, the one or more support sections can have a U-shaped cross section. Alternatively, the one or more support sections can be designed as circular-ring-shaped channels or sockets. In one embodiment, a multiplicity of spring tongues can be provided. In such case, the spring tongues can be arranged on a respective inner peripheral wall of the support sections. In one embodiment, two guide elements can be provided between the ball head and the joint socket. The guide element can be made of any suitable material, such as a metallic material.

The guide element preferably has an at least approximately U-shaped cross section, such that a half-shell is formed, on which half-shell the spring tongues are arranged.

Here, it is also possible to provide more than one guide element, in particular two guide elements, which adjoin one another with their base regions and are supported with their spring tongues on the ball head and with their respective support section on the inner periphery of the joint socket.

BRIEF DESCRIPTION OF THE DRAWINGS

Further details, advantages and features of the present invention emerge from the following description of exemplary embodiments on the basis of the drawing, in which.

DETAILED DESCRIPTION OF THE INVENTION

Figure 1:
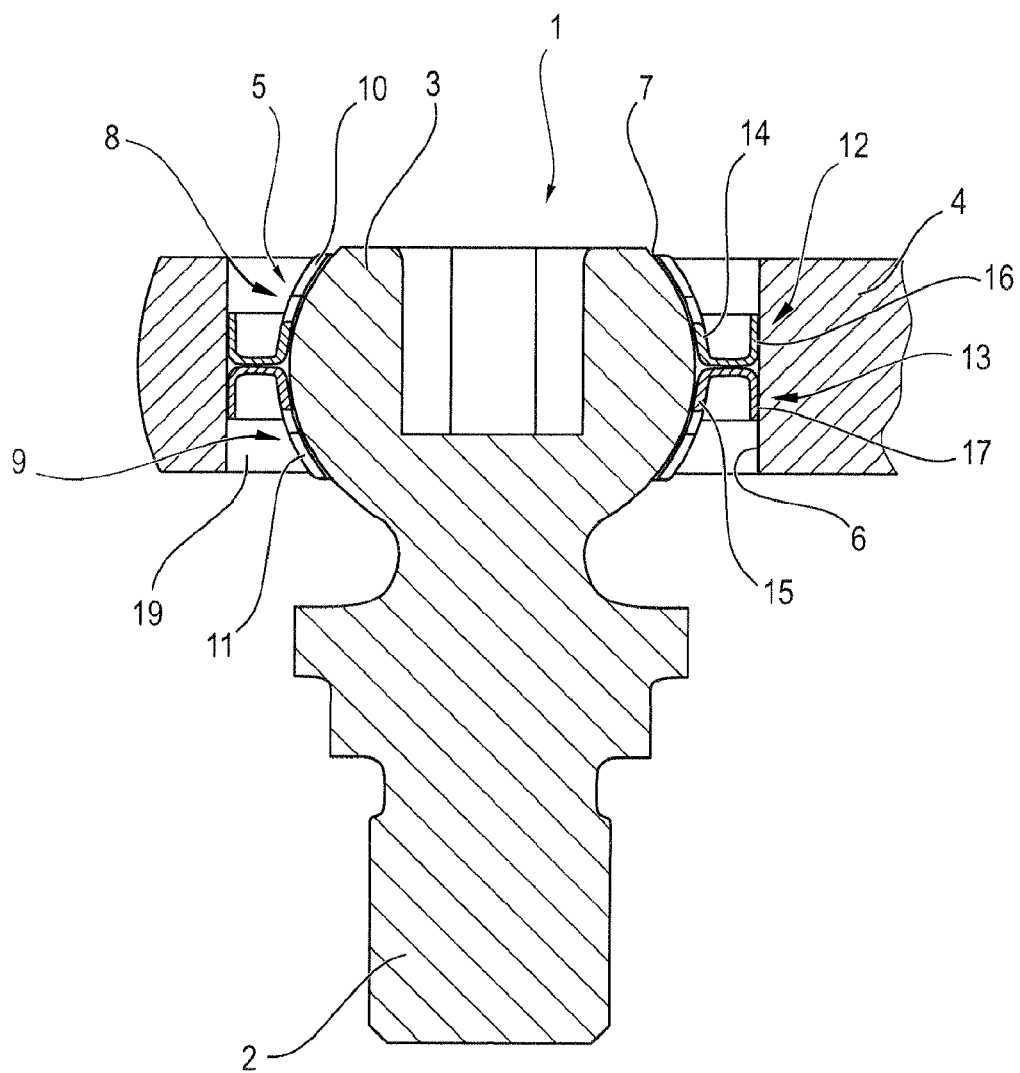
FIG. 1 shows a schematically slightly simplified illustration of a first embodiment of a coupling rod according to the invention.

According to the embodiment of FIG. 1, a coupling rod or coupling lever 1 is provided which has a first rod part 2 provided with a ball head 3.

The coupling rod 1 also has a second rod part 4 which has a joint socket 5 holding the ball head 3.

Here, FIG. 1 shows that the joint socket 5 does not bear directly against the ball head 3 but rather delimits, together with the ball head 3, a receiving space 19 in which, in the example, two guide elements 8 and 9 are arranged.

The guide elements 8 and 9 have in each case one channel-like or half-shell-like support section 12 and respectively, which support section has a substantially U-shaped cross section in the illustration shown in FIG. 1.

Formed in each case on the respective inner peripheral wall 14 and 15 of said support sections 12 and 13 are spring tongues 10 and 11 respectively which bear against the outer peripheral surface 7 of the ball head 8.

The respective outer peripheral wall 16 and 17 of the guide elements 8 and 9 bears against the inner peripheral surface 6 of the joint socket 4, as shown in detail in the illustration of FIG. 1. Play-free resilient support of the ball head 3 in the joint socket 4 is thereby obtained.

Figure 2:
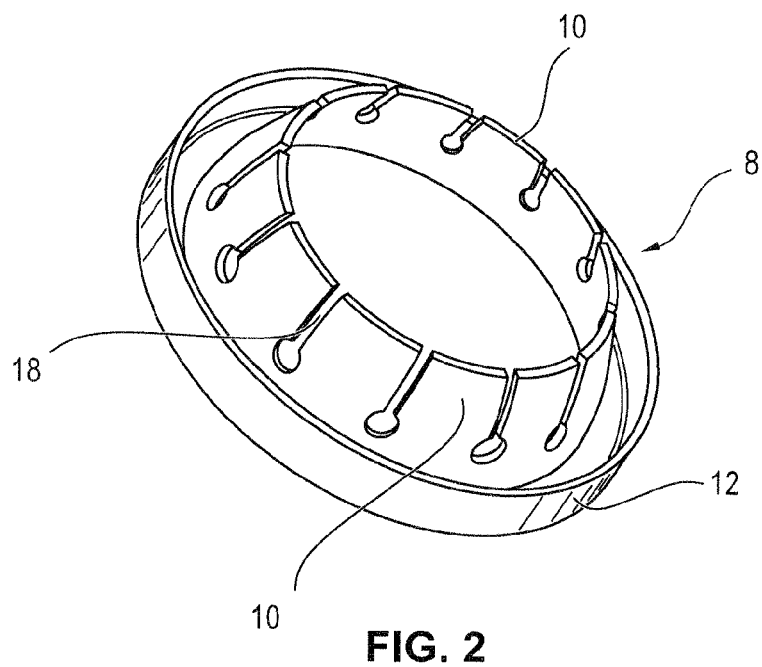
FIG. 2 shows a perspective view of a guide element.

FIG. 2 shows a guide element 8 in a perspective view. While FIG. 2 shows guide element 8, FIG. 2 and the associated description below also applies to guide element 9.

Said illustration shows the channel-like design of the support section 12 (or 13 in the case of guide element 9) and the arrangement of the spring tongues 10 (or 11 in the case of guide element 9). Here, FIG. 2 shows that preferably a multiplicity of spring tongues are provided, such as twelve spring tongues 10 in the example, which spring tongues are separated from one another by slots, of which one slot 18 is indicated in FIG. 2 as a representative for all the slots. The guide element 8 (or guide element 9) is preferably composed of a metallic material.

Figure 3:
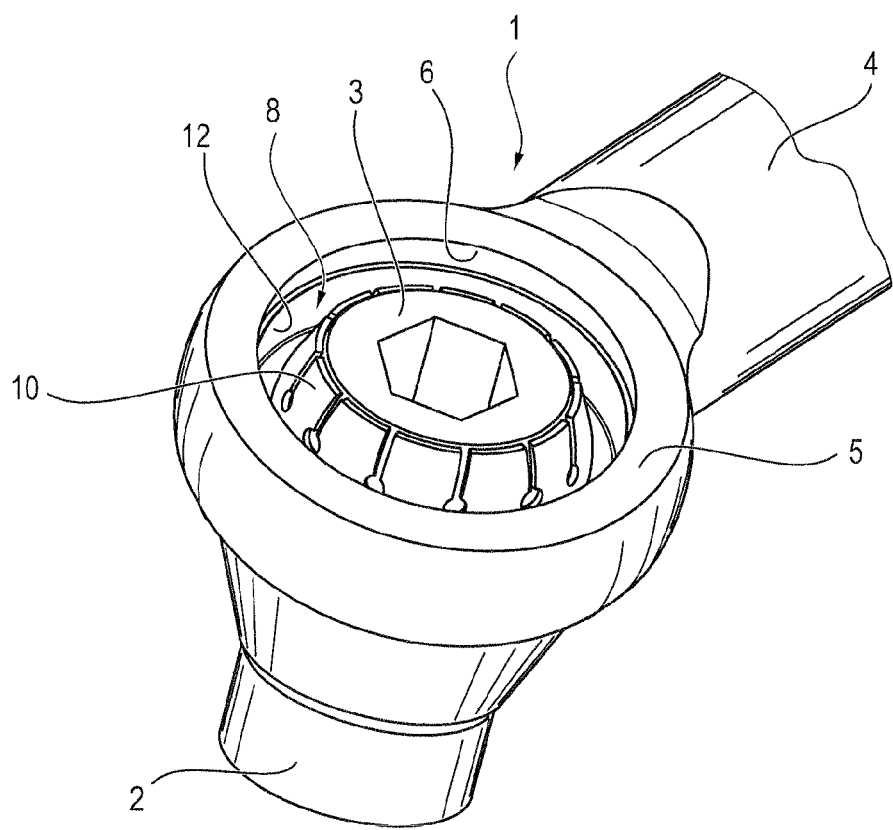
FIG. 3 shows a perspective view of the coupling rod 1 in which the guide element according to FIG. 2 is installed.

FIG. 3 shows the installed state of the guide element 8 or 9 in the coupling rod 1, and the abutment of the spring tongues 10 against the ball head 3 and of the support section 12 or 13 respectively against the inner peripheral surface 6 of the joint socket 5.

As explained in the introduction, it is possible, as in the embodiment according to FIG. 3, to provide only a single guide element 8 or, as in the embodiment according to FIG. 1, to provide two such guide elements 8 and 9 which bear with their bases against one another so as to provide the installation situation shown in FIG. 1, in which the upper guide element 8 opens in the upward direction while the lower guide element 9 in the illustration in FIG. 1 opens in the downward direction.

Figure 4:
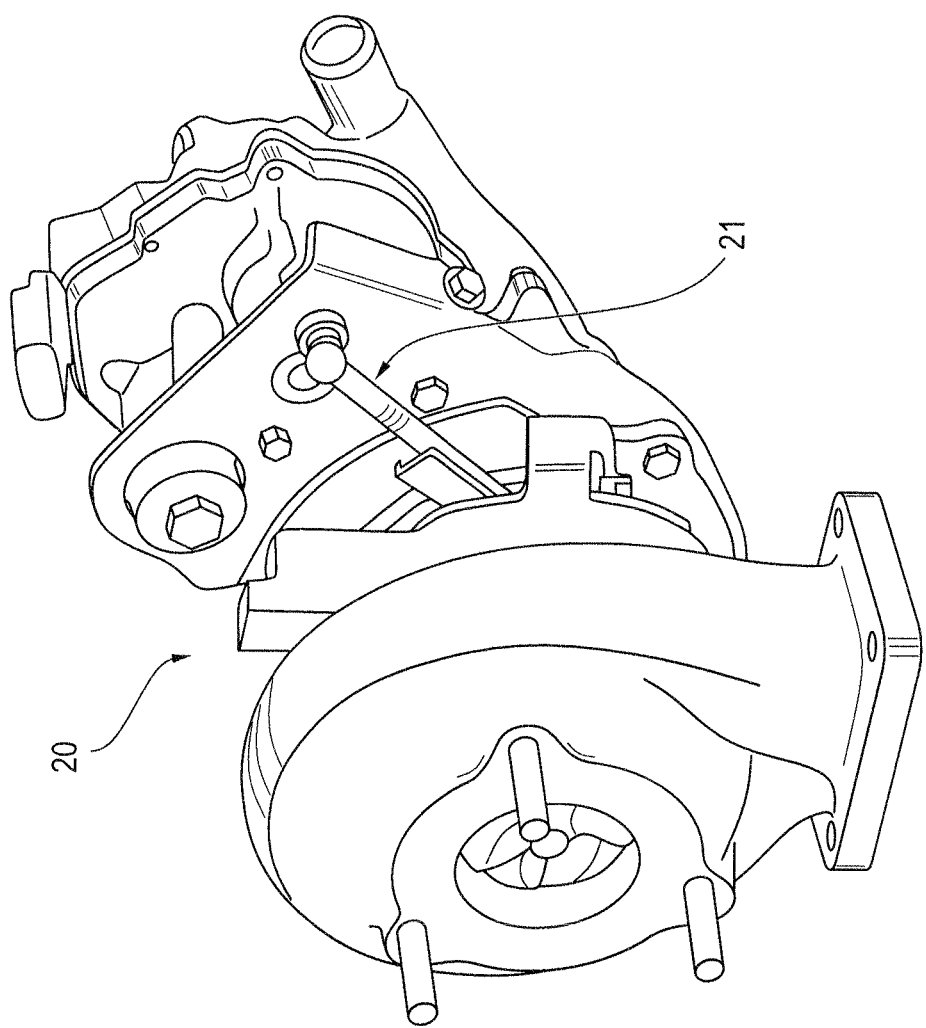
FIG. 4 shows a perspective illustration of an exhaust-gas turbocharger.

FIG. 4 illustrates an exhaust-gas turbocharger 20 according to the invention which has a compressor and a turbine and also an articulated mechanism 21 in which the coupling rod 1 according to the invention can be used.

In addition to the written disclosure of the invention above, reference is hereby explicitly made to the diagrammatic illustration of the invention in FIGS. 1 to 4.

LIST OF REFERENCE NUMERALS

1 Coupling rod
2 First rod part
3 Ball head
4 Second rod part
5 Joint socket
6 Inner peripheral surface
7 Outer peripheral surface
8, 9 Guide element
10, 11 Spring tongue
12, 13 Support section
14, 15 Inner peripheral wall
16, 17 Outer peripheral wall
18 Slot
19 Receiving space
20 Exhaust-gas turbocharger
21 Articulated mechanism

The invention claimed is:

1. A coupling rod (1) with vibration-damping properties, comprising:
a first rod (2) having a solid shaft and a ball head (3);
a second rod (4) having a joint socket (5) for receiving the ball head (3), the joint socket (5) having a cylindrical inner peripheral surface (6); and
two guide elements (8, 9) arranged between the cylindrical inner peripheral surface (6) of the joint socket (5) and an outer peripheral surface (7) of the ball head (3), each of the guide elements (8, 9) including a plurality of spring tongues (10, 11) and each guide element (8, 9) having a support section (12, 13) having an inner peripheral wall, the plurality of spring tongues being separated from each other by slots (18), each of the plurality of spring tongues (10, 11) bearing against the outer peripheral surface (7) of the ball head (3) and being connected to the support section (12, 13) of the guide element (8, 9), each support section (12, 13) of the guide elements (8, 9) has a U-shaped cross section including an outer peripheral wall (16, 17) having a cylindrical surface that bears solely against the cylindrical inner peripheral surface (6) of the joint socket (5), wherein the cylindrical inner surface (6) of the joint socket (5) solely contacts the outer peripheral wall (16, 17) of the guide elements (8, 9), and the guide elements (8, 9) contacting at most each other, the inner peripheral surface (6) of the joint socket (5), and the outer peripheral surface (7) of the ball head (3), the spring tongues (10, 11) being elastically deformable and the elastic deformability of the spring tongues providing a defined preload force for vibration-damping.

2. The coupling rod as claimed in claim 1, wherein the support section (12; 13) is designed as a circular-ring-shaped channel or socket.

3. The coupling rod as claimed in claim 1, wherein the plurality of spring tongues (10, 11) is arranged on the inner peripheral wall (14 and 15 respectively) of the support section (12 and 13 respectively).

4. The coupling rod as claimed in claim 1, wherein the guide elements (8, 9) are composed of a metallic material.

5. The coupling rod as claimed in claim 1, wherein the guide elements (8, 9) are arranged such that the transition between the support section (12, 13) and the plurality of spring tongues (10, 11) occurs at a middle region of the ball head (3).

6. The coupling rod as claimed in claim 5, wherein the plurality of spring tongues (10, 11) extends semi-spherically from the support section (12, 13) to a distal end.

7. The coupling rod as claimed in claim 1, wherein each of the plurality of spring tongues (10, 11) contacts flush against the outer peripheral surface (7) of the ball head (3).

8. The coupling rod as claimed in claim 1, wherein the ball head (3) includes a flat outer end region, wherein each of the plurality of spring tongues (10, 11) do not engage the flat outer end region.

9. The coupling rod as claimed in claim 1, wherein the two guide elements (8, 9) abut each other along a portion of their respective support sections (12, 13).

* * * * *